ns, Kalamazoo, Mich., assignors to The Upjohn Company, Kalamazoo, Mich., a corporation of Michigan

United States Patent Office 2,727,911
Patented Dec. 20, 1955

2,727,911

14α-HYDROXY-11-DESOXYCORTICOSTERONE AND 21-ACYLATES THEREOF

Herbert C. Murray, Hickory Corners, and Durey H. Peterson, Kalamazoo, Mich., assignors to The Upjohn Company, Kalamazoo, Mich., a corporation of Michigan No Drawing. Application August 28, 1952,
Serial No. 306,925

7 Claims. (Cl. 260—397.45)

This invention relates to steroids and more particularly to 14α-hydroxy-11-desoxycorticosterone and 14α-hydroxy-11-desoxycroticosterone-21-acylates.

The novel compounds of the present invention represented by the formula:

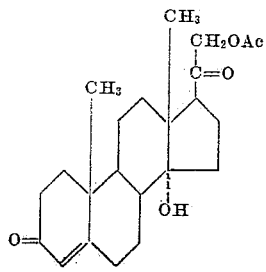

may be prepared by esterification of 14α-hydroxy-11-desoxycorticosterone. The 14α-hydroxy-11-desoxycorticosterone of the present invention is prepared by exposing 11-desoxycorticosterone-21-acetate [Steiger et al. Helv. Chim. Acta, 20, 1164 (1937)] to the oxygenating action of the fungus *Mucor griseocyanus*, a species of the genus Mucor of the family Mucoraceae of the order Mucorales, as described in the applications, of which this is a continuation-in-part, Serial No. 297,242, filed July 5, 1952, Serial No. 272,944, filed February 23, 1952, and issued as U. S. Patent 2,602,769, and Serial No. 180,496, filed August 19, 1950, and now abandoned.

It is an object of the present invention to prepare 14α-hydroxy-11-desoxycorticosterone and 14α-hydroxy-11-desoxycorticosterone-21-acylates. Other objects will be apparent to those skilled in the art to which this invention pertains.

The compounds of the present invention demonstrate pronounced anaesthetic, salt retention, glucocorticoid, hypertensive, estrogenic, testoid, folliculoid, luteoid, spermatogenic and progesterone activities. The compounds of the present invention also possesses lyophobic and an increased proportion of lyophilic groups causing them to be valuable interfacial tension modifying agents useful as emulsifying agents, emulsion breakers, suspending agents, and emulsion stabilizing agents. They may be used to prepare absorption bases having improved water absorption and emollient characteristics of utility in pharmacy and cosmetology alone, or as carriers for known medicaments. A suitable absorption base preparation may be made by melting together a mixture of 85 percent white petroleum, ten percent stearyl alcohol, and five percent oxygenated steroid, for example, 14α-hydroxy-11-desoxycorticosterone-21-acetate, and cooling the mixture while stirring until it congeals. The resulting absorption base may be readily triturated with aqueous material, at room temperature, or emulsified at elevated temperature, to form a smooth and stable water-in-oil emulsion. The compounds of the present invention are also useful in the preparation of cardiac active hormones.

The compounds of the present invention can be converted to the known 5-androstene-3β,14α-diol-17-one-3-acetate [Andre et al. Abstracts Am. Chem. Soc., Meeting, Buffalo, 38K (1952)] by oxidizing the 14α-hydroxy-11-desoxycorticosterone-21-acylates with chromic acid in acetic acid to produce 14α-hydroxyandrostendione and reduction of the latter compound with sodium borohydride produces 5-androstene-3β,14α-diol-17-one. The resulting 5-androstene-3β,14α-diol-17-one can be readily acetylated with acetic anhydride in pyridine to produce 5-androstene-3β,14α-diol-17-one-3-acetate.

In the preparation of the esters of 14α-hydroxy-11-desoxycorticosterone the starting 14α-hydroxy-11-desoxycorticosterone is admixed with an acylating agent such as, for example, ketene, a ketene of a selected acid, an acid, acid chloride, or acid anhydride, or other known acylating agent, usually in a solvent such as, for example, pyridine or the like, or an inert solvent, including solvents like benzene, toluene, ether, and the like, and heated at a temperature between about zero degrees centigrade and the boiling point of the reaction mixture, usually about room temperature, for a period between about a half hour and about 96 hours. The time of reaction is somewhat dependent upon the temperature at which the reaction is carried out, the acylating agent, and the ratio of reactants. The reaction mixture is quenched with ice or cold water, and the product is collected in an organic solvent which is thereafter washed with succesive portions of a mildly basic solution and water to obtain a solution of the product which is essentially neutral. In some instances, the product may crystallize from the reaction mixture, in which case it may be advantageous to separate the product by filtration or other means, wash with water, and thereafter purify by conventional means, such as, for example, by recrystallization from a suitable solvent or chromatographic purification, as deemed necessary.

The following examples will serve to illustrate the process and products of this invention, but the said invention is not to be considered as limited thereto.

*Example 1.—14α-hydroxy-11-desoxycorticosterone*

A medium was prepared of twenty grams of Edamine enzymatic digent of lactalbumin, three grams of corn steep liquor and fifty grams of technical dextrose diluted to one liter with tap water and adjusted to a pH of 4.3 to 4.5. Four liters of this sterilized medium was inoculated with *Mucor griseocyanus*, ATCC 1207a(+), and incubated for 24 hours at a temperature of 28 degrees centigrade using a rate of aeration and stirring such that the oxygen uptake was 6.3 to 7 millimoles per hour per liter of Na₂SO₃ according to the method of Cooper, Fernstrom and Miller, Ind. Eng. Chem., 36, 504 (1944). To this medium containing a 24 hour growth of *Mucor griseocyanus* was added 1.13 grams of 11-desoxycorticosterone-21-acetate in 100 milliliters of acetone to provide a suspension of the steroid in the culture. After an additional 24 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation to yield 2.5 grams of oily crystals. The solvent-free extract was triturated exhaustively with Skellysolve B petroleum ether and then with ether, leaving 0.64 gram of brown crystals which was dissolved in twelve milliliters of hot methanol. Filtering the mixture and cooling the filtrate to about ten degrees centigrade produced 0.2989 gram of white crystals melting at 175 to 176 degrees centigrade showing a characteristic infrared spectrum in chloroform differing from that of corticosterone, or the bioconversion product of 11-desoxycorticosterone by *Rhizopus arrhizus*. The molecule retained the conjugated ketone, the ketal side chain, and had one extra hydroxyl group. The infrared spectrum in Nujol mineral oil showed an additional extra hydroxyl indicating the possibility that a methanolate of 14α-hydroxy-11-desoxycorticosterone was produced having a carbon-hydrogen analysis as follows:

*Analysis.*—Calculated for $C_{21}H_{30}O_4$: C, 72.80; H, 8.73. Found (dried at 50 degrees centigrade): C, 70.37; H, 8.70. Found (dried at 100 degrees centigrade): C, 71.14; H, 8.62.

Crystallization of the methanolate from acetone produced crystals of identical melting point and infrared spectra in chloroform but the infrared spectrum on the Nujol mull no longer differed from that of the chloroform solution. The thus produced 14α-hydroxy-11-desoxycorticosterone melted at 175 to 176 degrees centigrade.

*Analysis.*—Calculated for $C_{21}H_{30}O_4$: C, 72.80; H, 8.73. Found: C, 72.16; H, 8.60.

*Example 2.—14α-hydroxy-11-desoxycorticosterone-21-acetate*

An 81-milligram sample of 14α-hydroxy-11-desoxycorticosterone was dissolved in two milliliters of absolute pyridine and one milliliter of acetic anhydride, chilled with ice, and diluted wth ice water. The resulting precipitate was filtered to give 88 milligrams of crystals which were dissolved in two milliliters of acetone. The resulting solution was concentrated and diluted with hexane to cloudiness and after two recrystallizations from acetone-hexane the compound had a melting point of 158 to 161 degrees centigrade. The infrared spectrum verified the structure of a monoacetate and the optical rotation $[\alpha]_D^{23}$ was plus 192 degrees (0.53 in chloroform).

*Analysis.*—Calculated for $C_{23}H_{32}O_5$: C, 71.10; H, 8.30. Found: C, 71.00; H, 8.71.

*Example 3.—14α-hydroxy-11-desoxycorticosterone-21-dimethylacetate*

In the same manner as given in Example 2, using the equivalent proportion of dimethylacetic anhydride in place of acetic anhydride produced 14α-hydroxy-11-desoxycorticosterone-21-dimethylacetate.

*Example 4.—14α-hydroxy-11-desoxycorticosterone-21-(β-cyclopentylpropionate)*

In the same manner as given in Example 2, using the equivalent proportion of β-cyclopentylpropionyl chloride in place of acetic anhydride produced 14α-hydroxy-11-desoxycorticosterone-21-(β-cyclopentylpropionate).

*Example 5.—14α-hydroxy-11-desoxycorticosterone-21-benzoate*

In the same manner as given in Example 2, using the equivalent proportion of benzoyl chloride in place of acetic anhydride produced 14α - hydroxy - 11 - desoxycorticosterone-21-benzoate.

*Example 6.—14α-hydroxy-11-desoxycorticosterone-21-trimethylacetate*

In the same manner as given in Example 2, using the equivalent proportion of trimethylacetic anhydride in place of acetic anhydride produced 14α-hydroxy-11-desoxycorticosterone-21-trimethylacetate.

In a similar manner, other esters of 14α-hydroxy-11-desoxycorticosterone are prepared by reacting 14α-hydroxy-11-desoxycorticosterone with the selected acid anhydride in pyridine or with other acylating agents and solvents as previously described in this specification. Representative esters of 14α-hydroxy-11-desoxycorticosterone thus prepared suitably include one to eight carbon atom carboxylic acid acyloxy esters of saturated or unsaturated aliphatic or cycloaliphatic, carbocyclic, aryl, arylalkyl, alkaryl, mono-, di- or poly-carboxylic acids, which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, cyclopentylformyloxy, acryloxy, cyclohexylformyloxy, β-cyclopentylpropionyloxy, the half and diesters of malonic, maleic, succinic, glutaric, adipic acids, and the like. The acids may also contain non-interfering substituents, such as mono or poly, chloro, bromo, hydroxy, methoxy, and the like.

It is to be understood that the invention is not to be limited to the exact details or exact compounds shown and described, as obvious modifications and equivalents will be apparent to one skilled in the art, and the invention is therefore to be limited only by the scope of the appended claims.

We claim:

1. A compound represented by the graphical formula:

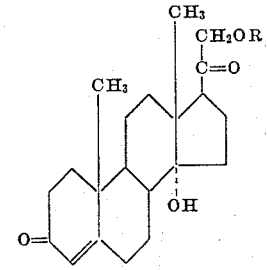

wherein R is selected from the radicals consisting of hydrogen and hydrocarbon-carboxylic acyl radical containing from one to eight carbon atoms, inclusively.

2. 14α-hydroxy-11-desoxycorticosterone.

3. A 14α-hydroxy-11-desoxycorticosterone-21-acylate ester of a hydrocarbon carboxylic acid containing from one to eight carbon atoms, inclusively.

4. 14α-hydroxy-11-desoxycorticosterone-21-acetate.

5. 14α-hydroxy-11-desoxycorticosterone - 21-(β-cyclopentylpropionate).

6. 14α-hydroxy-11-desoxycorticosterone-21-benzoate.

7. 14α-hydroxy-11-desoxycorticosterone-21-trimethylacetate.

No references cited.